(12) United States Patent
Kanouda et al.

(10) Patent No.: US 7,049,711 B2
(45) Date of Patent: May 23, 2006

(54) UNINTERRUPTIBLE POWER SYSTEM

(75) Inventors: Akihiko Kanouda, Hitachinaka (JP);
Fumikazu Takahashi, Hitachi (JP);
Minehiro Nemoto, Hitachi (JP);
Masahiro Hamaogi, Odawara (JP)

(73) Assignees: Hitachi, Ltd., Tokyo (JP); Hitachi Computer Peripherals Co., Ltd., Ashigarakami-gun (JP)

( * ) Notice: Subject to any disclaimer, the term of this patent is extended or adjusted under 35 U.S.C. 154(b) by 0 days.

(21) Appl. No.: 10/623,681

(22) Filed: Jul. 22, 2003

(65) Prior Publication Data

US 2004/0125626 A1 Jul. 1, 2004

(30) Foreign Application Priority Data

Dec. 10, 2002 (JP) .............. 2002-358008

(51) Int. Cl.
*H02J 7/00* (2006.01)
(52) U.S. Cl. ...................................... 307/66
(58) Field of Classification Search ................. 363/84, 363/89, 125; 307/64, 66, 80, 82
See application file for complete search history.

(56) References Cited

U.S. PATENT DOCUMENTS

| | | | | |
|---|---|---|---|---|
| 5,315,533 A | * | 5/1994 | Stich et al. | 700/298 |
| 5,465,011 A | * | 11/1995 | Miller et al. | 307/64 |
| 5,631,814 A | * | 5/1997 | Zak | 363/37 |
| 5,744,932 A | * | 4/1998 | Kissel | 320/106 |
| 5,987,236 A | * | 11/1999 | Yoneda | 703/13 |
| 6,198,257 B1 | * | 3/2001 | Belehradek et al. | 323/222 |
| 6,507,507 B1 | * | 1/2003 | Tokunaga et al. | 363/89 |

FOREIGN PATENT DOCUMENTS

| | | |
|---|---|---|
| JP | 2000-116029 | 4/2000 |
| JP | 2002-171692 | 6/2002 |

OTHER PUBLICATIONS

U.S. Appl. No. 10/412,231, filed Apr. 14, 2003 (US Equiv. of JP 2002-113116).
U.S. Appl. No. 10/412,319, filed Apr. 14, 2003 (US Equiv. of JP 2002-113117).
U.S. Appl. No. 09/931,250, filed Aug. 17, 2001.
U.S. Appl. No. 10/083,638, filed Feb. 27, 2002.

* cited by examiner

*Primary Examiner*—Adolf Berhane
(74) *Attorney, Agent, or Firm*—Antonelli, Terry, Stout and Kraus, LLP.

(57) ABSTRACT

A boost circuit is connected to a rechargeable battery and a switch is connected between a rectification circuit and a power factor correction converter. In the power failure state, the switch is turned on to activate the boost circuit and energy of the rechargeable battery is supplied to a load by rasing the voltage at two steps in the path from the boost circuit, switch, and to power factor correction converter. Since the voltage of the battery can be lowered, the number of serially connected cells can be made small. The volume of UPS can be reduced and a low cost can be realized. Since the number of serially connected cells is reduced, the reliability against failure of battery cells can be improved.

18 Claims, 6 Drawing Sheets

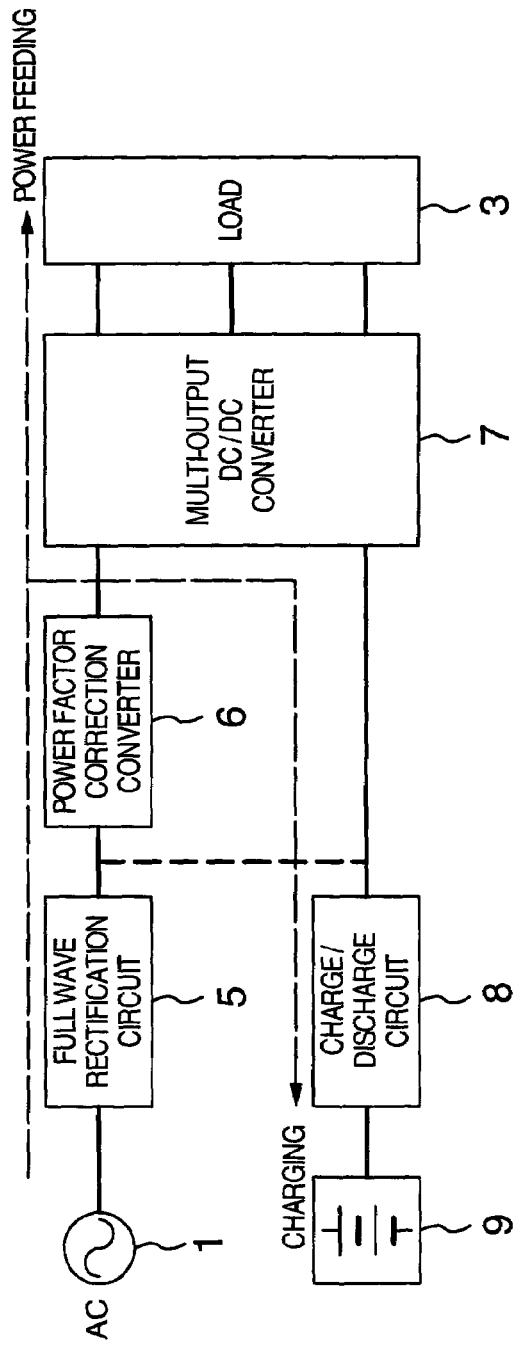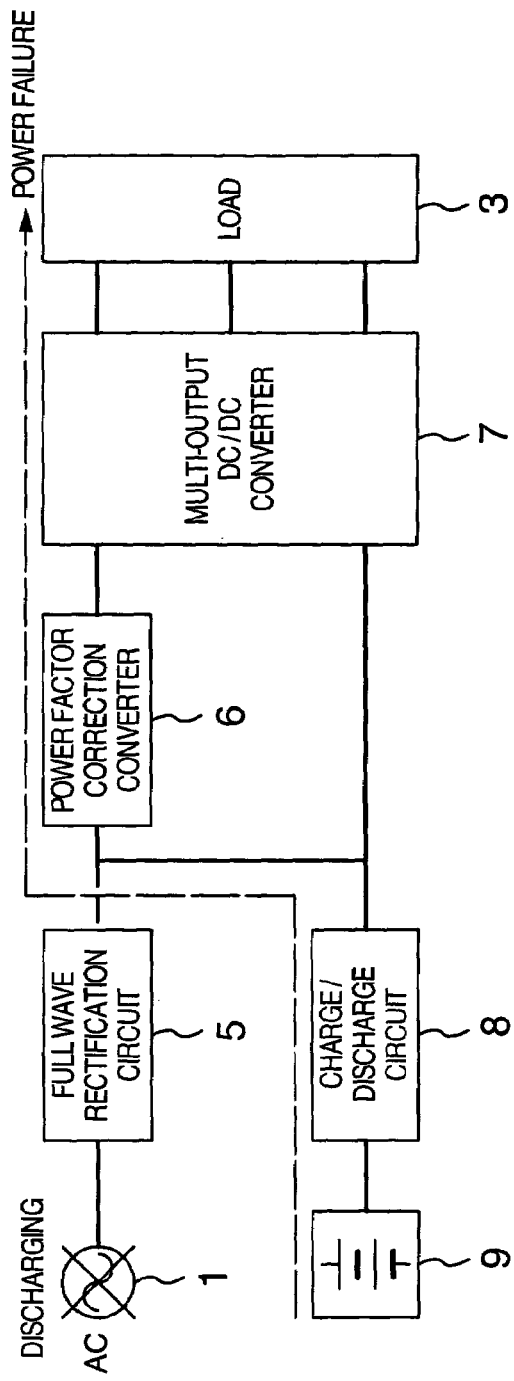
FIG.4A
IN NORMAL AC POWER
FIG.4B
IN AC POWER FAILURE

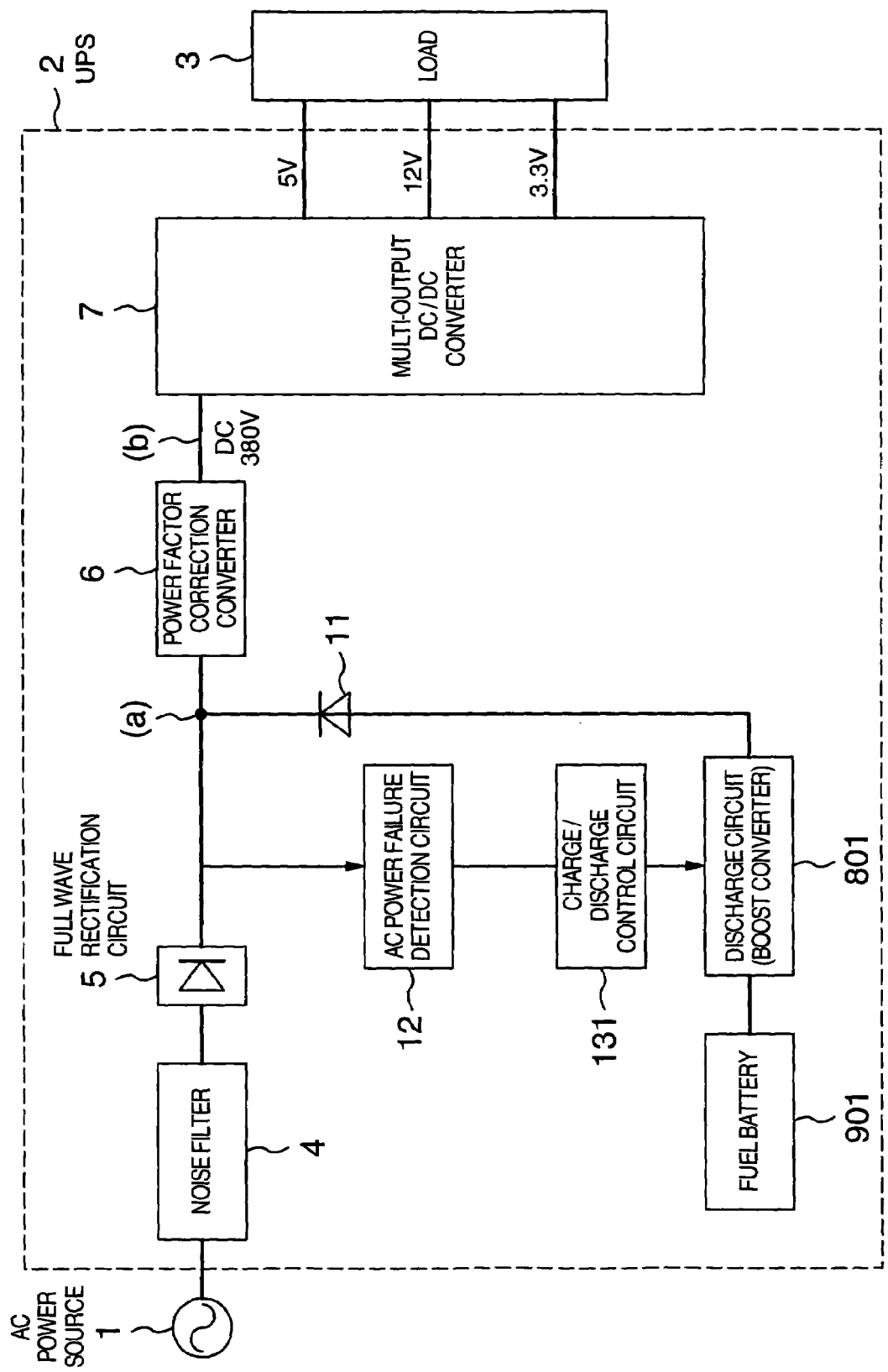

UNINTERRUPTIBLE POWER SYSTEM

CROSS-REFERENCE TO RELATED APPLICATIONS

The present application is relevant to U.S. patent application Ser. No. 10/412,231 being filed by Akihiko Kanouda, Minehiro Nemoto, Fumikazu Takahashi, Masahiro Hamaogi, Yoshihide Takahashi, Takashi Tanabe, Takao Gotou, Masato Isogai, Toshikatsu Miyata, and assigned to the present assignees, based on Japanese Patent Application No. 2002-113116 filed on Apr. 16, 2002, and U.S. patent application Ser. No. 10/412,319 being filed by Minehiro Nemoto, Akihiko Kanouda, Fumikazu Takahashi, Masahiro Hamaogi, Yashihide Takahashi, Takashi Tanabe, Takao Gotou, Masato Isogai, Toshikatsu Miyata, and assigned to the present assignees, based on Japanese Patent Application No. 2002-113117 filed on Apr. 16, 2002. The contents of the applications are incorporated herein by reference.

BACKGROUND OF THE INVENTION (A) Field of the Invention

The present invention relates to an uninterruptible power system (UPS) capable of supplying a stable power to a load even when an AC power failure occurs.

(B) Description of Related Art

When a power failure occurs, damages such as data loss are feared in a so-called information processing apparatus such as a server, a router and a storage. As countermeasures for power failure, an uninterruptible power system (UPS) has been installed which uses an energy accumulation unit such as a rechargeable battery. UPS includes an AC output type and a DC output type. The former is more popular and inserts an uninterruptible power system between a commercial AC power source and a subject apparatus. Basing upon the DC output characteristics, the latter generally adopts the structure that an uninterruptible power system is connected to a DC line at the succeeding stage of an AC/DC converter of an apparatus. Examples of the latter are disclosed in Patent Document 1 and Japanese Patent Laid-open Publication No. 2002-171692.

According to these conventional technologies, an AC power is supplied from an AC power source to a rectification circuit and to a power factor correction circuit. A DC power is then supplied to a DC output DC/DC converter whereat the DC power is converted into a plurality of DC powers having desired voltages and currents which are supplied to loads. In a power failure state, a DC power is supplied from a battery to a backup converter and to the DC output DC/DC converter. In a power normal state, the battery is charged with a charger.

Patent Document 1:
JP-A-2000-116029

(Abstract and Others)

In a conventional backup power source, during a power failure, a DC voltage, e.g., 380 V, is required to be generated from a battery via a backup converter. It is conceivable that a lead battery is often used as the backup battery. The voltage of a lead battery per cell is about 12 V. From recent requirements for compact and light weight batteries, it is supposed that rechargeable batteries having a higher energy density are used, including nickel metal hydride (NiMH) batteries, lithium-ion (Li-ion) batteries and the like. The NiMH battery is about 1.2 V per cell, and the Li-ion battery is about 3.7 V per cell. It is also expected to use a high capacity charge accumulation unit such as an electric double layer capacitor and a fuel battery expected to be in practical use in the future.

As a backup converter, a non-isolated, boost chopper type converter may be used which has a relatively simple and compact structure and is easy to be controlled. A ratio of a low side voltage to a high side voltage of this converter is required to be suppressed to a range from about 1.2 times to about 3 times when the circuit efficiency is taken into consideration. The number of battery cells is therefore about 105 to 264 cells for an NiMH battery and about 34 to 86 cells for a Li-ion battery.

Such a large number of serially connected battery cells poses some problems of a variation in States of Charges (SOC) of cells and the reliability against occurrence of a cell shortage failure. From this reason, system sides require that the number of serially connected cells is to be suppressed to 30 cells or less at the most.

In order to reduce the number of serially connected cells, it is essential to realize a high boost ratio of an isolated converter using a transformer. However, this results in not only a complicated structure but also a high cost and a large size.

SUMMARY OF THE INVENTION

It is an object of the present invention to provide an uninterruptible power system capable of setting relatively low a voltage of an energy accumulation unit such as a battery.

It is another object of the present invention to provide an uninterruptible power system capable of configuring an energy accumulation unit with the appropriate number of serially connected cells of about 30 cells or less, even if a high energy density rechargeable battery, a high capacity charge accumulation unit or a fuel battery is used.

It is yet another object of the present invention to provide an uninterruptible power system capable of using a non-isolated, boost type converter having a relatively simple and compact structure and being easy to control.

It is yet another object of the present invention to provide an uninterruptible power system capable of using a battery charge circuit with a simple structure or not using the battery charge circuit.

According to one aspect of the invention, a power in energy accumulation means is passed through serially connected two boost means to be converted into a desired power and supplied to a load.

According to another aspect of the invention, an uninterruptible power system comprises: a power factor correction boost converter for receiving an output of a rectification circuit, suppressing input current harmonics by switching control, and supplying a power to an output converter; and boost means for boosting an output of energy accumulation means to feed a power to the output converter, wherein a power in the energy accumulation means is supplied to an input side of the boost converter via boost means.

A relatively low voltage of energy accumulation means can be boosted to a desired voltage by two-stage boost means. If the power factor correction boost converter is used, already present boost means can be efficiently utilized so that the system can be made simple, compact and inexpensive.

According to another aspect of the invention, a portion of an output side of the output DC/DC converter is coupled to a high voltage side of the boost means, the boost means is a bi-directional DC/DC converter capable of a voltage lowering operation in a reverse direction, the boost means charges the energy accumulation means while the AC power source is normal, and while the AC power source fails, the boost means performs a voltage raising operation to control the discharge from the energy accumulation means to the input side of the boost converter.

The bi-directional DC/DC converter can be effectively used for the charge/discharge control both in the power failure state and power normal state. The system can be further made simple, compact and inexpensive.

According to another aspect of the invention, a voltage on a high voltage side of the bi-directional DC/DC converter is set higher while the AC power source fails and is backed up than while the AC power source is normal.

Accordingly, the bi-directional DC/DC converter can be used also for the charge operation in the range determined by a voltage raising factor necessary for the AC power failure, without making the system bulky.

Other objects, features and advantages of the invention will become apparent from the following description of the embodiments of the invention taken in conjunction with the accompanying drawings.

BRIEF DESCRIPTION OF THE DRAWINGS

FIGS. 4A and 4B are diagrams illustrating the flows of electric energy according to the embodiment of the invention.

FIG. 6 is a diagram showing the structure of an uninterruptible power system using a fuel battery according to a second embodiment of the invention.

DESCRIPTION OF THE EMBODIMENTS

Figure 1:
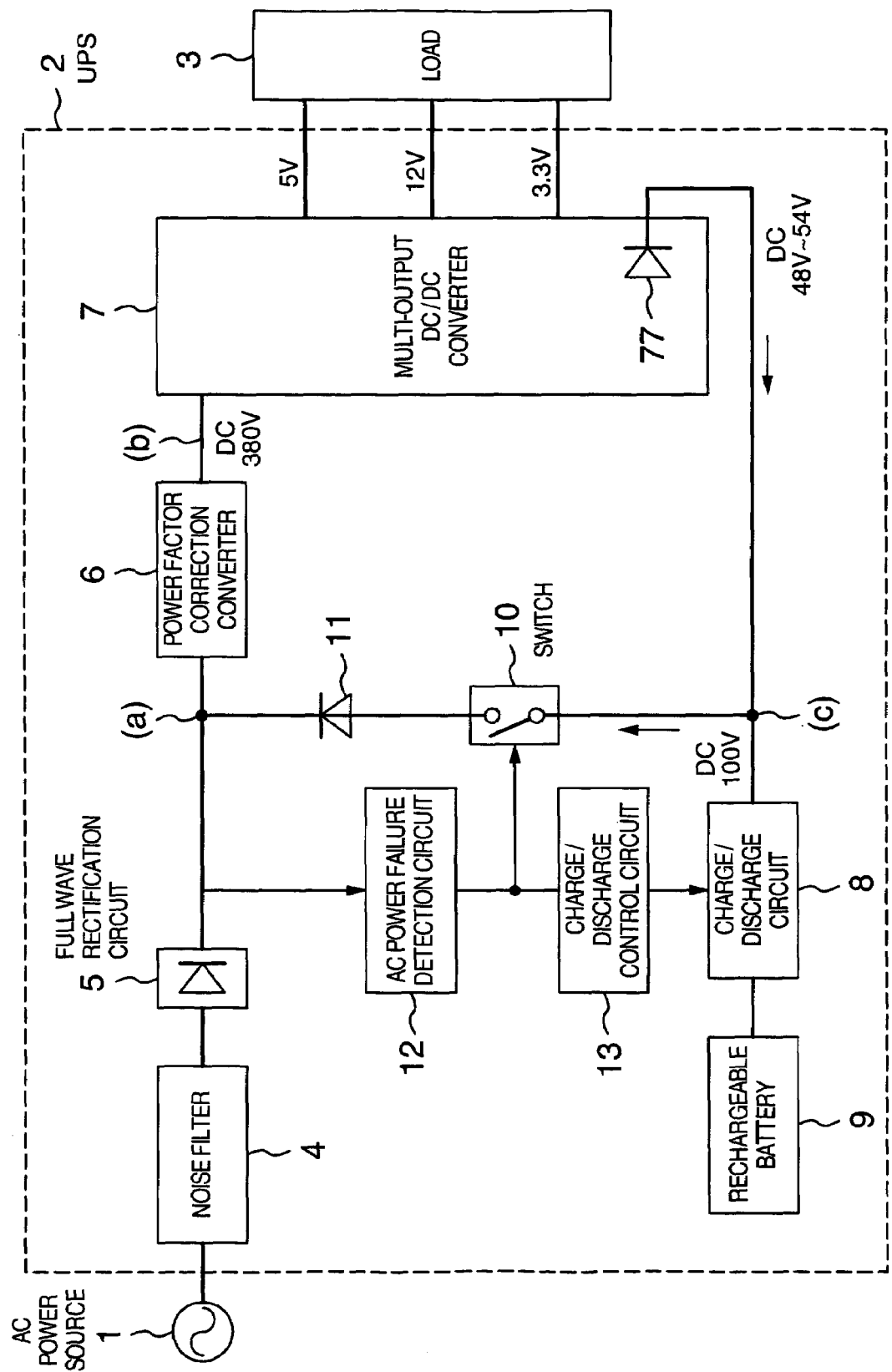
FIG. 1 is a block diagram showing the structure of an uninterruptible power system according to an embodiment of the invention.

FIG. 1 is a block diagram showing the structure of an uninterruptible power system according to an embodiment of the invention. A commercial AC power source 1 feeds a power to a load 3 via an uninterruptible power system (UPS) 2. In the uninterruptible power system (UPS) 2, a noise filer 4 is provided connected to the AC power source 1. An output of the noise filter 4 is supplied to a full wave rectification circuit 5. An output point (a) of the full wave rectification circuit 5 is connected to a power factor correction converter 6. This power factor correction converter 6 is a boost type converter for suppressing input current harmonics through switching control, the details of this converter being later described. DC 380 V appears at an output point (b) of the power correction converter 6. DC 380 V is applied to a multi-output DC/DC converter 7 which feeds powers having different voltages to the load 3. In this example, 5 V, 12 V and 3.3 V are applied to the load. The multi-output DC/DC converter 7 has another output point (c) connected to a diode 77 to be described later, the output point being connected to a charge/discharge circuit 8. In a normal state of the AC power source 1, the charge/discharge circuit 8 lowers the voltage at the output point (c) of the multi-output DC/DC converter 7 to charge a rechargeable battery 9.

A serial connection of a switch 10 and a diode 11 is connected between the output point (c) of the charge/discharge circuit 8 and the input point (a) of the power factor correction converter 6.

An AC power failure detection circuit 12 is connected to the input point of the power factor correction converter 6, i.e., the output point (a) of the full wave rectification circuit 5. An output of the AC power failure detection circuit 12 controls to turn on and off the switch 10, and supplies a control instruction to a charge/discharge control circuit 13.

The operation of the embodiment will be briefly described. In the normal state of the AC power source 1, an AC power is supplied via the noise filter 4 to the full wave rectification circuit 5 to be rectified and then supplied to the power factor correction converter 6. The power factor correction converter 6 flows current proportional to the amplitude of an output voltage of the full wave rectification circuit 5 to boost the voltage, for example, to DC 380 V. An output voltage 380 V of the power factor correction converter 6 is applied to the multi-output DC/DC converter 7 so that DC voltages of 5 V, 12 V and 3.3 V are applied to the load 3.

DC voltage of about 48 V to 54 V is applied to the charge/discharge circuit 8 from the output point (c) of the diode 77 in the multi-output DC/DC converter 7. The AC power failure detection circuit 12 maintains the switch 10 open because a power failure is not detected presently, and it instructs the charge/discharge control circuit 13 to charge the rechargeable battery 9 by using the charge/discharge circuit 8.

Figure 2:
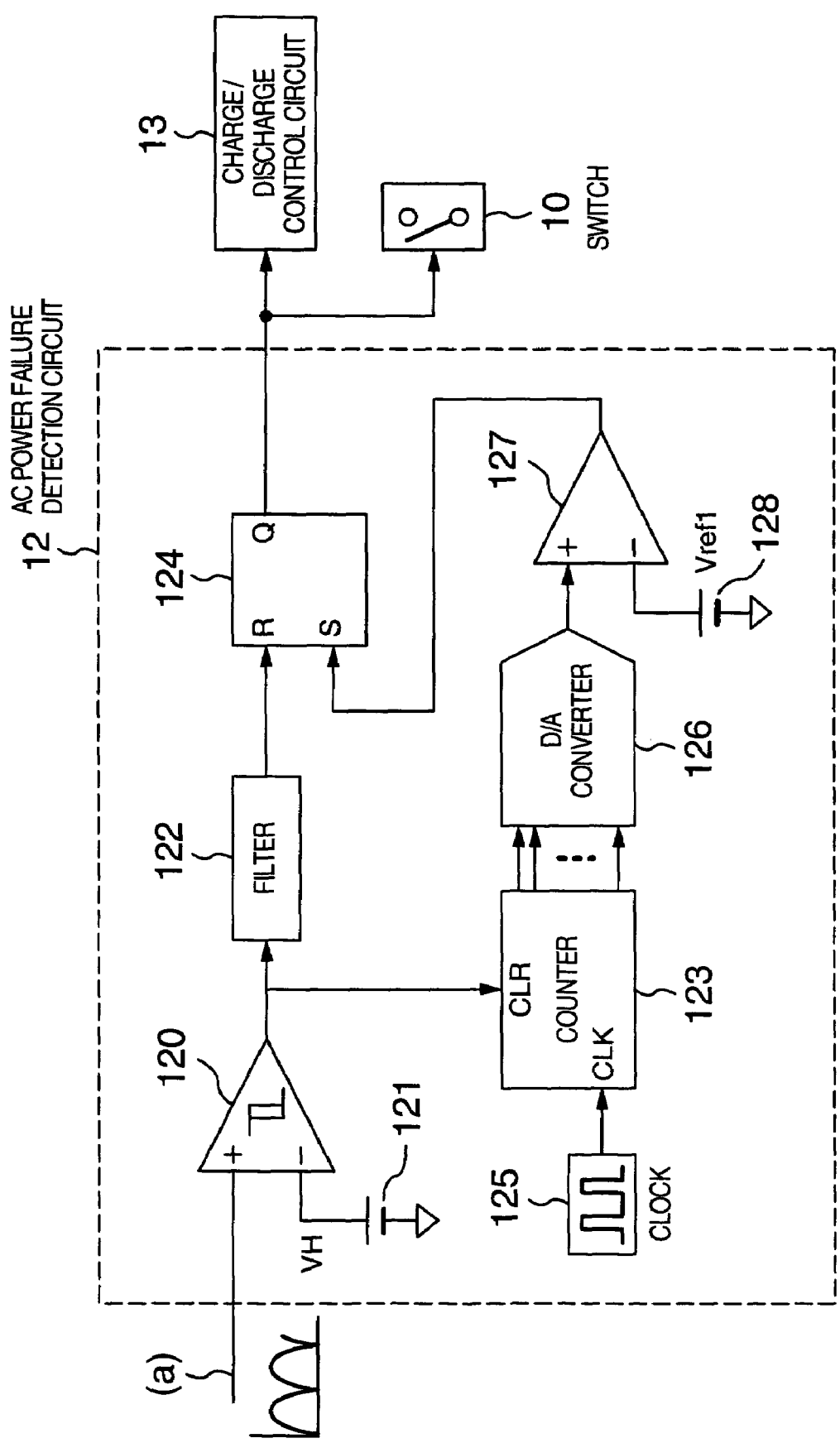
FIG. 2 is a block diagram showing the structure of an AC power failure detection circuit according to the embodiment of the invention.

FIG. 2 is a block diagram showing an example of the structure of the AC power failure detection circuit 12 in UPS 2 shown in FIG. 1, according to the embodiment of the invention. The output point (a) of the full wave rectification circuit 5 shown in FIG. 1 is connected to an inverting input terminal of a hysteresis comparator 120 in the AC power failure detection circuit 12. A reference voltage source 121 is connected to a non-inverting input terminal of the hysteresis comparator 120. An output of the hysteresis comparator 120 is connected to a filter 122 and a clear terminal of a counter 123. An output of the filter 122 is applied to a reset terminal of an RS flip flop circuit 124. A clock generator 125 is connected to a clock terminal of the counter 123, and an output of the counter 123 is supplied to a D/A converter 126. An output of the D/A converter 126 is applied to a non-inverting input terminal of a comparator 127. A reference voltage source 128 is connected to an inverting input terminal of the comparator 127. An output of the comparator 127 is applied to a set terminal of the RS flip flop circuit 124. An output Q of the RS flip flop circuit 124 is output to an external of the AC power failure detection circuit 12 and applied to the charge/discharge control circuit 13 and to the switch 10.

Next, by referring to FIG. 3 and FIGS. 4A and 4B, description will be given on the operation of the embodiment described with reference to FIGS. 1 and 2.

While the commercial AC power source 1 is in the normal state, a power is supplied from the AC power source 1 to the full wave rectification circuit 5 via the noise filter 4 and rectified at the full wave rectification circuit 5.

Figure 3:
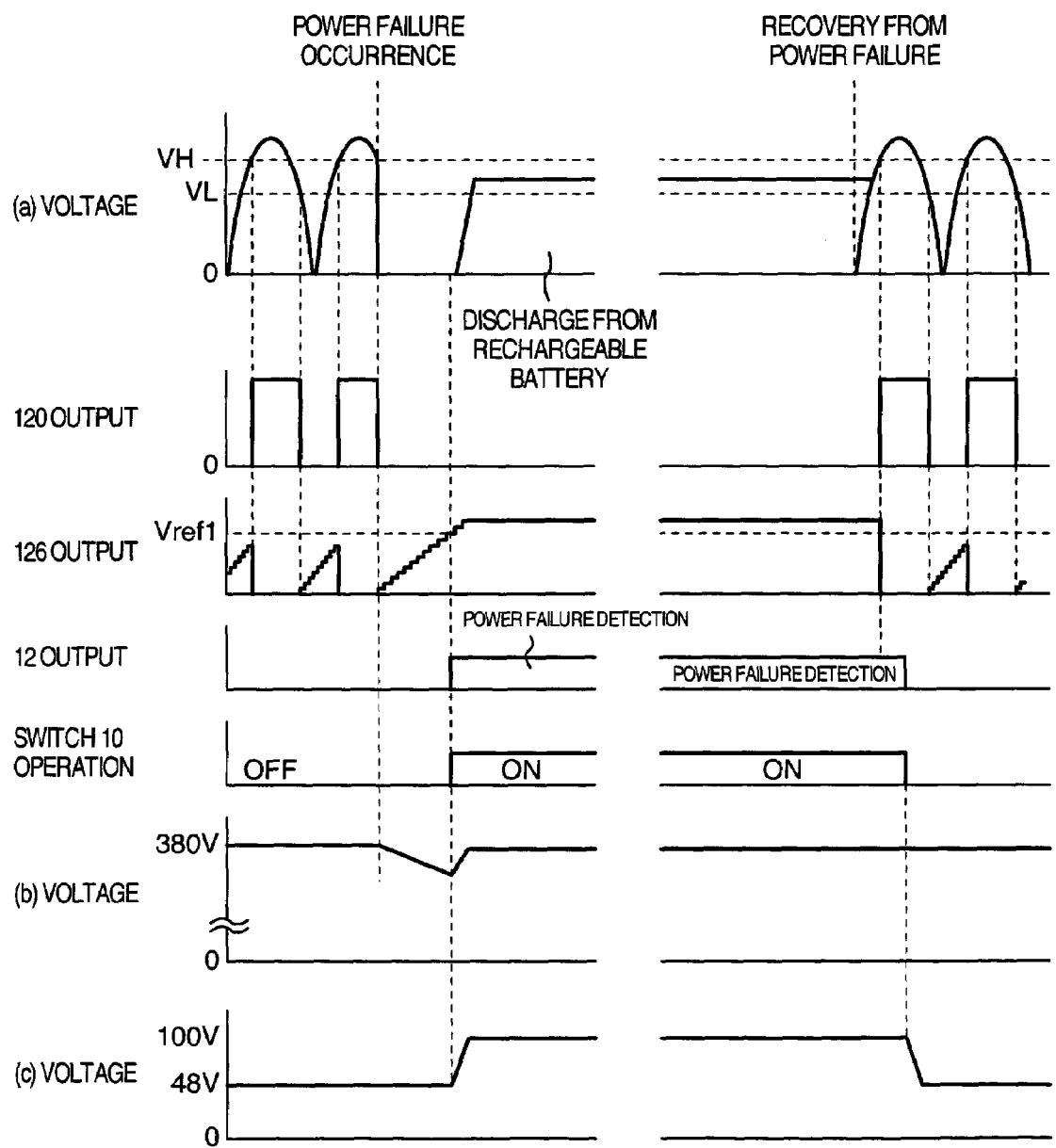
FIG. 3 is a timing chart showing voltage and operation waveforms in each circuit portion according to the embodiment of the invention.

FIG. 3 is a timing chart showing voltage and operation waveforms in each circuit portion according to the embodiment. A voltage at the output point (a) of the full wave rectification circuit 5 is input to the power factor correction converter 6. The power factor correction converter 6 flows current proportional to the amplitude of an output voltage at the output point (a) of the full wave rectification circuit 5 to boost the voltage. An output waveform at the output point (b) has, for example, a constant DC 380 V as shown in FIG. 3. The output voltage 380 V is applied to the multi-output DC/DC converter 7 so that DC voltages of 5 V, 12 V and 3.3 V are applied to the load 3. DC voltage of about 48 V to 54 V is applied to the charge/discharge circuit 8 from the output point (c) of the multi-output DC/DC converter 7.

At this time, the voltage at the output point (a) of the full wave rectification circuit is applied to the hysteresis comparator 120 in the AC power failure detection circuit 12. In the actual case, a divided voltage of the voltage at the output point (a) is applied to the hysteresis comparator, since the breakdown voltage of the hysteresis comparator 120 is about several V to 15 V. The voltage at the output point (a) is illustratively shown in FIG. 2. A voltage of the reference voltage source 121 to be applied to the non-inverting input terminal of the hysteresis comparator 120 is lower than the peak value of the output at the output point (a) of the full wave rectification circuit. As shown in FIG. 3, an output of the hysteresis comparator 120 has therefore a pulse waveform having a frequency as twice high as the AC power source frequency. Clocks of the clock generator 125 having a frequency sufficiently higher than the AC power source frequency are supplied to the clock input terminal CLK of the counter 123 to count up the counter 123. An output of the counter is reset when a pulse waveform output from the hysteresis comparator 120 is input to the clear terminal CLR of the counter 123. An output of the counter 123 is converted into an analog voltage by the D/A converter 126. An output of the D/A converter 126 has the waveform indicated by "126 OUTPUT" in FIG. 3. The counter 123 is so designed that it is reset before it counts up to the voltage of the reference voltage source 128 of the succeeding stage comparator 127, in the normal state, i.e., in the normal state of the commercial AC power source 1. In the normal state therefore, an output of the comparator 127 takes always a Low level. Hence, a set input S and an output Q of the RS flip flop circuit 124 are always Low. In the normal state, an output of the AC power failure detection circuit 12 is, therefore, always Low.

While an output of the AC power failure detection circuit 12 is Low, the switch 10 maintains off whereas the charge/discharge control circuit 13 takes a charge mode for charging the rechargeable battery 9. In this mode, the charge/discharge circuit 8 lowers the voltage of 48 V to 54 V at the output point (c) to charge the rechargeable battery 9. The rechargeable battery 9 is preferably a serial connection of 25 to 30 cells of, for example, an NiMH battery. The number of serially connected cells is set so that the maximum value of the voltage of charged cells will not exceed the voltage at the output point (c) of the charge/discharge circuit and that the voltage reduction ratio becomes small.

The following operations are performed after the commercial AC power source 1 fails. In the AC power failure detection circuit 12 shown in FIG. 2, the voltage at the output point (a) of the full wave rectification circuit becomes 0 so that the output of the hysteresis comparator 120 takes the Low level. Then, the input of the clear CLR of the counter 123 is reduced to zero so that the output of the counter 123 and the D/A comparator 126 exceeds a reference voltage Vref1 of the reference voltage source 128 and the comparator 127 is inverted to a High level. The output Q of the RS flip flop circuit 124, i.e., the output of the AC power failure detection circuit 12, takes therefore the High level. In this manner, the AC power failure detection circuit 12 detects a power failure.

Upon the detection of a power failure, in the circuit shown in FIG. 1, the switch 10 turns on, which otherwise normally off. The control of the charge/discharge circuit 8 by the charge/discharge control circuit 13 is switched from the charge mode to the discharge mode.

In this discharge mode, the charge/discharge circuit 8 raises the voltage of the rechargeable battery 9 and apply it to the output point (c) of the charge/discharge circuit. A voltage command value is set to the charge/discharge circuit 8 in such a manner that the voltage at the output point (c) becomes higher than that in the normal power state. For example, the voltage at the output point (c) of the charge/discharge circuit is set to DC 100 V in the discharge mode. This voltage is set lower than the reference voltage VH of the reference voltage source 121 of the hysteresis comparator 120.

This DC voltage 100 V at the output point (c) of the charge/discharge circuit is applied via the switch 10 and diode 11 to the output point (a) of the full wave rectification circuit, and raised to DC 380 V by the power factor correction converter 6. The power factor correction converter 6 is controlled so that it has a current command value proportional to the amplitude of voltage at the output point (a) of the full wave rectification circuit. The power factor correction converter 6 operates therefore at a constant current command value after the voltage at the output point (a) of the full wave rectification circuit (a) becomes constant.

Upon reception of stable DC 380 V, the multi-output DC/DC converter 7 continues to operate stably and supplies a power to the load 3 without interruption.

In this discharge mode, the voltage at the output point (c) of the charge/discharge circuit 8 is controlled to be at DC 100 V by the charge/discharge circuit 8. As a result, of the outputs from the multi-output DC/DC converter 7, the output to the output point (c) of the charge/discharge circuit is not supplied because a reverse bias is applied to the diode 77.

As described above, according to this embodiment, the voltage at the charge/discharge circuit output point (c) is raised in the power failure state to prevent a circulation from the charge/discharge circuit output point (c)→power factor correction converter 6→multi-output DC/DC converter 7→charge/discharge circuit output point (c).

When the power failure is recovered, this recovery is judged because a voltage higher than DC 100 V is applied to the hysteresis converter 120 in the AC power failure detection circuit 12 shown in FIG. 2. The counter 123 is thus reset. At the same time, a pulse output from the filter 122 is applied to the reset input terminal R of the RS flip flop circuit 124 to invert the output of the AC power failure detection circuit 12 to the Low level to thus detect the recovery from the power failure. After the power failure is detected, the switch 10 is turned off and the charge/discharge circuit 8 is switched to the charge mode to recover the normal operation.

FIGS. 4A and 4B are diagrams explaining a flow of electric energy according to the embodiment of the invention. FIG. 4A shows the energy flow while the AC power source 1 is normal. A power is supplied to the load 3 from the commercial AC power source 1 via the full wave rectification circuit 5, power factor correction converter 6 and multi-output DC/DC converter 7. The rechargeable battery 9 is charged by the multi-output DC/DC converter 7 via the charge/discharge circuit 8.

FIG. 4B shows the flow while the AC power source 1 fails. A power is supplied to the load 3 from the rechargeable battery 9 via the charge-discharge circuit 8, power factor correction converter 6 and multi-output DC/DC converter 7.

The main structure of the embodiment will be summarized in the following. The main circuitry includes the rectification circuit 5 connected to the AC power source 1, the boost type converter 6 for receiving an output of the rectification circuit 5 to suppress input current harmonics under switching control, and the output converter 7 for converting an output of the boost type converter 6 into desired DC voltages and supplying a power to the load 3. Power failure is dealt with the uninterruptible power system 2 having the structure constituted of the energy accumulation unit (rechargeable battery) 9 and the boost unit (charge/discharge circuit or boost chopper) 8 for feeding a power from the energy accumulation unit to the output converter 7. The boost unit 8 boosts a power supplied from the energy accumulation unit 9 and supplies a power to the input side (a) of the boost type converter 6.

One of the outputs of the output converter 7 is applied to the high voltage side (c) of the boost unit 8, and a bi-directional DC/DC converter capable of lowering a voltage in a reverse direction is used as the boost unit 8. While the AC power source 1 is normal, this bi-directional DC/DC converter 8 charges the energy accumulation unit 9 by activating its voltage lowering operation. While the AC power source 1 fails, a power from the energy accumulation unit 9 is boosted and supplied to the input side (a) of the boost type converter 6.

The switch 10 is provided between the input side (a) of the boost type converter 6 and the bi-directional DC/DC converter 8. While the AC power source 1 is normal, the switch 10 is turned off to charge the energy accumulation unit 9 by the voltage lowering operation of the bi-directional DC/DC converter 8. While the AC power source 1 fails, the switch 10 is turned on to supply the energy in the energy accumulation unit 9 to the boost type converter 6 via the switch 10 by the voltage raising operation of the bi-directional DC/DC converter 8.

In this embodiment, although an NiMH battery is used as the rechargeable battery 9, other rechargeable batteries such as a Li-ion battery and a lead battery, or an electric double layer capacitor may also be used. As the AC power failure detection circuit 12, other circuits for synchronizing with the voltage phase of the commercial AC power source 1, such as a phase locked loop (PLL), may be used. The switch 10 may be a semiconductor switch such as a power MOSFET and an IGBT. Other switches such as a relay may also be used. In place of the diode 11 and switch 10, a semiconductor switching device having a reverse breakdown voltage may be used.

Figure 5:
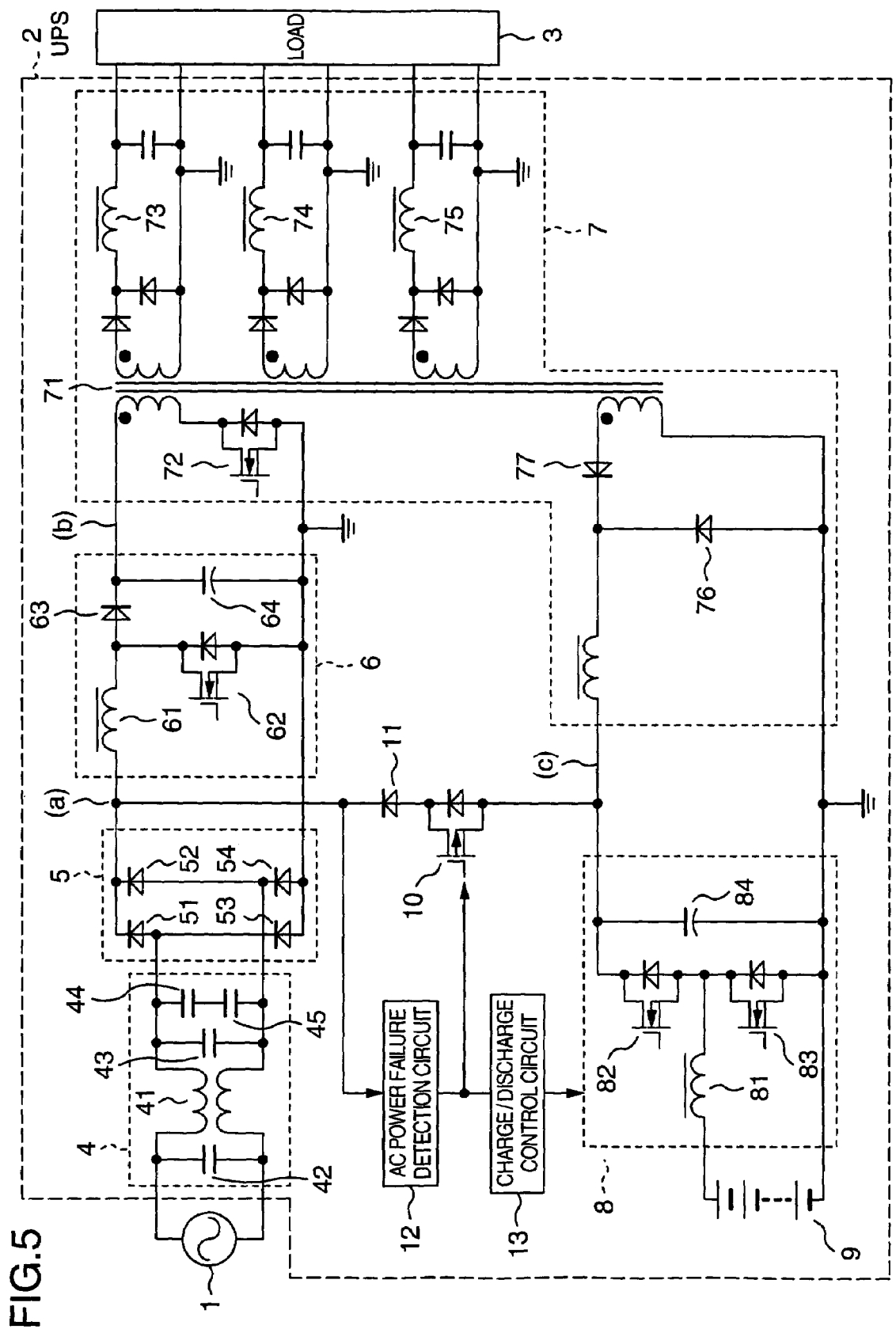
FIG. 5 is a circuit diagram showing the specific structure of the uninterruptible power system according to the embodiment of the invention.

FIG. 5 is a circuit diagram showing the specific structure of the uninterruptible power system according to the embodiment of the invention. The commercial AC power source 1 is connected to the noise filter 4 in UPS 2. The noise filter 4 is constituted of a common-mode choke 41 and capacitors 42 to 45. An output of the noise filter 4 is supplied to the full wave rectification circuit 5. The full wave rectification circuit 5 is a bridge circuit made of diodes 51 to 54. An output point on the high potential side of the full wave rectification circuit 5 corresponds to the output point (a) of the full wave rectification circuit, the output point being connected to the power factor correction converter 6 and AC power failure detection circuit 12. The power factor correction converter 6 is a boost converter constituted of a choke coil 61, a power MOSFET 62, a diode 63 and an output capacitor 64. The output point (c) of the power factor correction converter is connected to the multi-output DC/DC converter 7. This converter 7 has a power MOSFET 72 on the primary winding side of a multi-coil transformer 71 and rectification and smooth circuits 73 to 76 on the secondary winding side. The rectification and smooth circuit 73 to 75 are connected to the load 3 to supply powers having different DC voltages. The rectification and smooth circuit 76 has the diode 77 shown in FIG. 1 and is connected to the output point (c) of the charge/discharge circuit 8.

The charge/discharge circuit 8 is a DC/DC converter called a binant converter or bi-directional converter, and is a voltage raising/lowering chopper constituted of a choke coil 81, power MOSFETs 82 and 83 and a capacitor 84.

The rechargeable battery 9 is connected to the lower voltage side of the charge/discharge circuit 8. Connected to the output point (c) of the charge/discharge circuit 8 is the source of a p-channel power MOSFET as the switch 10. The drain thereof is connected to the anode of the diode 11. The cathode of the diode 11 is connected to the output point (a) of the full wave rectification circuit.

FIG. 6 is a diagram showing the structure of an uninterruptible power system according to a second embodiment of the invention. In FIG. 6, like constituent elements to those shown in the other drawings are represented by identical reference numerals and the duplicate description thereof is omitted. Different points from those shown in FIG. 1 reside in that a fuel battery 901 is used as the energy accumulation unit, that a discharge circuit (boost converter) 801 is used in place of the charge/discharge circuit 8 and that a charge control circuit 131 is used in place of the charge/discharge control circuit 13. Because of this structure, a charge output from the multi-output DC/DC converter 7 does not exist and the switch 10 is not needed. While the commercial AC power source 1 is normal, an output of the AC power failure detection circuit 12 is Low and the boost converter 801 is in a stop state. Since the fuel battery 901 is not necessary to be charged if fuel is properly supplied, the charge control is not necessary in the normal power source state, which is different from the first embodiment. The operation during the power failure is similar to that of the first embodiment.

In the second embodiment, the structure of the multi-output DC/DC converter 7 can be simplified. The charge/discharge circuit 8 shown in FIG. 1, i.e., the bi-directional DC/DC converter and the charge control circuit, are not necessary.

In the second embodiment, in addition to the fuel battery, other various types of batteries may also be used including a primary battery, a solar battery and the like.

According to the above-described embodiments of the invention, the embodiments can have the merit that the number of serially connected battery cells can be made smaller than a conventional multi-output converter having a backup function. The volume of UPS can therefore be reduced and a low cost can be realized. As the battery charge/discharge circuit, a non-isolated type bi-directional DC/DC converter with a simple structure can be used so that the circuit can be made compact and inexpensive. The assembly densities of a system, an information processing apparatus and a server can be improved.

Since a lead battery is not used but a nickel metal hydride battery can be used, a safe system can be provided by mitigating an environment load to be incurred by dumping lead batteries.

According to the invention, an uninterruptible power system (UPS) can be provided which can lower the voltage of the energy accumulation unit. The number of serially connected battery cells can be made smaller than a conventional multi-output converter having a backup function. The volume of UPS can therefore be reduced and a low cost can be realized. Since the number of serially connected cells can be reduced, the reliability against failure of battery cells can be improved.

As the battery charge/discharge circuit, a non-isolated type bi-directional DC/DC converter with a simple structure can be used so that the circuit can be made compact and inexpensive. The assembly densities of a system, an information processing apparatus and a server can be improved.

Since a lead battery is not used but a nickel metal hydride battery can be used, a safe system can be provided by mitigating an environment load to be incurred by dumping lead batteries.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An uninterruptible power system for inputting an AC power, converting the AC power into a desired power, supplying the desired power to a load, and upon occurrence of an AC failure, converting a DC power from energy accumulation means into the desired power and supplying the desired power to the load, wherein the DC power from said energy accumulation means is passed through two serially connected boost means, and thereafter the power is converted into the desired power to be supplied to the load,
wherein first boost means of the two serially connected boost means, which is nearer to the energy accumulation means, raises the DC electric power from said energy accumulation means to supply second boost means of the two serially connected boost means when supply of electric power is interrupted, and lowers inputted electric power for charging the electric accumulation means during an ordinary operation.

2. An uninterruptible power system according to claim 1, wherein first boost means is a boost converter for receiving an output of said energy accumulation means, boosting the output by switching control and supplying the boost output to the second boost means.

3. An uninterruptible power system according to claim 1, wherein one of said two boost means is a boost converter for receiving an output of a rectification circuit and suppressing input current harmonics of said AC power by switching control.

4. An uninterruptible power system according to claim 3, wherein the other of said two boost means is a boost converter for receiving an output of said energy accumulation means, boosting the output by switching control, and supplying the boost output to an input side of said boost converter.

5. An uninterruptible power system according to claim 1, comprising: a rectification circuit connected to an AC power source; the first boost means for boosting an output of said rectification circuit; a multi-output converter for converting an output of said first boost means into a plurality of difference DC voltages; and the second boost means for feeding a power in said energy accumulation means to said first boost means upon occurrence of an AC power failure.

6. An uninterruptible power system according to claim 5, wherein said first boost means is a boost converter for receiving an output of said rectification circuit and suppressing input current harmonics of said AC power by switching control.

7. An uninterruptible power system according to claim 5, wherein said second boost means is a boost converter for receiving an output of said energy accumulation means, boosting the output by switching control, and supplying the boost output to an input side of said boost converter.

8. An uninterruptible power system comprising:
a rectification circuit connected to an AC power source;
a boost converter for receiving an output of said rectification circuit and suppressing input current harmonics by switching control;
an output converter for converting an output of said boost converter into a desired DC voltage to be supplied to a load;
energy accumulation means; and
boost means for feeding a DC power in said energy accumulation means towards said output converter upon occurrence of an AC power failure,
wherein said boost means boosts the DC power in said energy accumulation means and feeding the boost power to an input side of said boost converter to supply said boost converter when supply of electric power is interrupted, and lowers inputted electric power for charging the electric accumulation means during an ordinary operation.

9. An uninterruptible power system according to claim 8, wherein said energy accumulation means is a rechargeable battery, an electric double layer capacitor or a fuel cell.

10. An uninterruptible power system according to claim 8, wherein said output converter converts an output of said boost converter into a plurality of different DC voltages and supplying the voltages to the load.

11. An uninterruptible power system according to claim 10, wherein said energy accumulation means is a rechargeable battery, an electric double layer capacitor or a fuel cell.

12. An uninterruptible power system comprising:
a rectification circuit connected to an AC power source;
a boost converter for receiving an output of said rectification circuit and suppressing input current harmonics of said AC power by switching control;
an output converter for converting an output of said boost converter into a desired DC voltage to be supplied to a load;
energy accumulation means; and
boost means for feeding a DC power in said energy accumulation means towards said output converter upon occurrence of an AC power failure,
wherein a portion of an output side of said output converter is coupled to a high voltage side of said boost means, said boost means is a bi-directional DC/DC converter capable of a back mode operation in a reverse direction, said boost means lowers inputted electric power for charging said energy accumulation means while the AC power source is normal, and while the AC power source fails, said boost means boosts the DC power in said energy accumulation means and supplies the boost power to an input side of said boost converter.

13. An uninterruptible power system according to claim 12, wherein a voltage on a high voltage side of the bi-directional DC/DC converter is set higher while the AC power source fails than while the AC power source is normal.

14. An uninterruptible power system according to claim 12, wherein switch means is provided between an input side of said boost converter and a high voltage side of said bi-directional DC/DC converter, while the AC power source is normal, said switch means is turned off and said bi-directional DC/DC converter performs a voltage lowering operation to charge said energy accumulation means, and while the AC power source fails, said switch means is turned on and said bi-directional DC/DC converter performs a voltage raising operation to supply an energy in said energy accumulation means to said boost converter via said switch means.

15. An uninterruptible power system according to claim 14, wherein a voltage on a high voltage side of the bi-directional DC/DC converter is set higher while the AC power source fails than while the AC power source is normal.

16. An uninterruptible power system according to claim 12, wherein said output converter converts an output of said boost converter into a plurality of different DC voltages to be supplied to the load.

17. An uninterruptible power system according to claim 16, wherein switch means is provided between an input side of said boost converter and a high voltage side of said bi-directional DC/DC converter, while the AC power source is normal, said switch means is turned off and said bi-directional DC/DC converter performs a voltage lowering operation to charge said energy accumulation means, and while the AC power source fails, said switch means is turned on and said bi-directional DC/DC converter performs a voltage raising operation to supply an energy in said energy accumulation means to said boost converter via said switch means.

18. An uninterruptible power system according to claim 17, wherein a voltage on a high voltage side of the bi-directional DC/DC converter is set higher while the AC power source fails than while the AC power source is normal.

* * * * *